(12) United States Patent
Childers et al.

(10) Patent No.: US 10,664,929 B2
(45) Date of Patent: May 26, 2020

(54) EXTRACTING DATA FOR PROFESSIONAL EVENT AND PARTICIPANT GROUPING RECOMMENDATIONS

(71) Applicant: International Business Machines Corporation, Armonk, NY (US)

(72) Inventors: Adam B. Childers, Tucson, AZ (US); Richard B. Finch, New Paltz, NY (US); Claudia Isabel Sandoval Antunez, Guadalupe Zapopan (MX); Gerald Stanquist, Salt Point, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 16/011,861

(22) Filed: Jun. 19, 2018

(65) Prior Publication Data
US 2019/0385243 A1    Dec. 19, 2019

(51) Int. Cl.
*G06F 16/00* (2019.01)
*G06Q 50/00* (2012.01)
(Continued)

(52) U.S. Cl.
CPC .......... *G06Q 50/01* (2013.01); *G06F 16/313* (2019.01); *G06F 16/337* (2019.01);
(Continued)

(58) Field of Classification Search
CPC ................ G06Q 50/01; G06Q 30/0282; G06F 16/9535; G06F 16/5846; G06F 16/637; G06F 16/337; G06F 16/313
See application file for complete search history.

(56) References Cited

U.S. PATENT DOCUMENTS

| 7,707,246 B1 | 4/2010 | Issa et al. |
| 7,925,540 B1 | 4/2011 | Orttung et al. |

(Continued)

FOREIGN PATENT DOCUMENTS

| CN | 1580706 A | 2/2005 |
| DE | 10005780 A1 | 8/2001 |
| DE | 102008035944 A1 | 4/2010 |

OTHER PUBLICATIONS

Khrouf et al, "Hybrid Event Recommendation using Linked Data and User Diversity", ACM, RecSys'13, pp. 185-192 (Year: 2013).*

(Continued)

*Primary Examiner* — Alexander Khong
(74) *Attorney, Agent, or Firm* — Cantor Colburn LLP; Tihon Poltavets

(57) ABSTRACT

Provided are systems, methods, and media for building a dynamic digital profile of a user to generate a user grouping recommendation. An example method includes receiving, by a system comprising one or more processors, social media data pertaining to a user. The method includes building, by the system, a digital profile of the user based on extraction of a combination of one or more of image data, text data, and/or location data, in which the building of the digital profile includes generating, by the system, a keywords ranking. The method includes generating, by the system, a user grouping recommendation for the user based on the ranking of keywords, in which the user grouping recommendation includes event data and a list of one or more second users attending the event.

20 Claims, 6 Drawing Sheets

(51) Int. Cl.
   *G06Q 30/02* (2012.01)
   *G06F 16/31* (2019.01)
   *G06F 16/335* (2019.01)
   *G06F 16/635* (2019.01)
   *G06F 16/9535* (2019.01)
   *G06F 16/583* (2019.01)

(52) U.S. Cl.
   CPC ........ *G06F 16/5846* (2019.01); *G06F 16/637* (2019.01); *G06F 16/9535* (2019.01); *G06Q 30/0282* (2013.01)

(56) References Cited

U.S. PATENT DOCUMENTS

| | | | |
|---|---|---|---|
| 8,090,707 | B1 | 1/2012 | Orttung et al. |
| 8,171,044 | B2 | 5/2012 | Daigle |
| 8,832,301 | B2* | 9/2014 | Graff .................. G06Q 10/1093 709/231 |
| 9,374,399 | B1* | 6/2016 | Lin ........................ G06Q 30/02 |
| 9,760,955 | B2* | 9/2017 | Soni ........................ G06F 16/70 |
| 9,794,752 | B1 | 10/2017 | Doherty et al. |
| 2003/0040946 | A1 | 2/2003 | Sprenger et al. |
| 2008/0154696 | A1* | 6/2008 | Spiegelman ........... G06Q 30/02 705/7.32 |
| 2011/0137989 | A1 | 6/2011 | Kiciman et al. |
| 2012/0213404 | A1* | 8/2012 | Steiner ................ G06F 16/5838 382/103 |
| 2014/0358632 | A1* | 12/2014 | Graff .................. G06F 16/9537 705/7.29 |
| 2015/0127728 | A1 | 5/2015 | Marti et al. |
| 2015/0127737 | A1 | 5/2015 | Thompson et al. |
| 2017/0004439 | A1 | 1/2017 | Bostick et al. |
| 2017/0177586 | A1 | 6/2017 | Balduzzi et al. |
| 2017/0185601 | A1* | 6/2017 | Qin .................... G06F 16/24578 |

OTHER PUBLICATIONS

Anonymous; "Generating Travel Itineraries Based on User Interests"; IP.com Disclosure No. IPCOM000252013D; Dec. 13, 2017; 38 pages.

Anonymous; "Intelligent Seat Assignment System"; IP.com Disclosure No. IPCOM000246258D; May 20, 2016; 3 pages.

Mell et al.; "The NIST Definition of Cloud Computing-Recommendations of the National Institute of Standards and Technology"; US Department of Commerce, National Institute of Standards and Technology; Sep. 2011; 7 pages.

Palani; "Understanding Semantic Analysis (and Why This Title is Totally Meta)"; Jan. 10, 2018; <https://boomtrain.com/understanding-semantic-analysis/>; 6 pages.

* cited by examiner

EXTRACTING DATA FOR PROFESSIONAL EVENT AND PARTICIPANT GROUPING RECOMMENDATIONS

BACKGROUND

The present invention generally relates to social media based recommendation systems, specifically to social grouping and recommendation systems based on a dynamic social media footprint (i.e., digital profile).

People have extensively involved themselves with social media in recent years. As an individual's digital media footprint expands, so too does the number of applications, digital stores, tools, and other services that rely on the digital media footprint. Some systems generate a digital footprint for a user but those digital footprints are narrow in scope. The narrow digital footprints limit the system's ability to provide broad recommendations for the user. For example, some systems provide an online tool that provides recommendations based on items that the user views or purchases. The purchase history is then leveraged by the system to generate a recommendation as to a next purchase. Similarly, some systems provide an online tool that utilizes location history to recommend a future location. However, those recommendation systems are limited to the scope of the particular tool and thus are limited to providing a recommendation of a further action based on prior actions of a same or similar type that is based on a limited knowledge-base of user associated data.

As used interchangeably herein, the phrases "digital profile," "social media footprint," and "digital footprint" broadly refer to a profile and/or model that uniquely identifies a person based on social media data associated with the person.

As used herein, the phrase "machine learning" broadly describes a function of an electronic system that learns from data. A machine learning system, engine, or module can include a trainable machine learning algorithm that can be trained, such as in an external cloud environment, to learn functional relationships between inputs and outputs that are currently unknown.

As used interchangeably herein, the phrases "product or service" and "item" broadly refer to any tangible or intangible good or service that can be purchased and/or consumed by a user.

SUMMARY

Embodiments of the present invention provide a computer-implemented method for building a dynamic digital profile of a user to generate a social grouping recommendation. A non-limiting example of the computer-implemented method includes receiving, by a system comprising one or more processors, social media data of a user, in which the social media data is received from at least one of a social network website, social network application, or a user device associated with the user. The method includes building, by the system, a digital profile of the user. The building of the digital profile includes extracting, by the system, image data of the user from the social media data of the user and performing, by the system, image recognition on the extracted image data to generate one or more clusters of images from the extracted image data and to identify a first set of keywords associated with each cluster of images, in which the images are clustered based on objects detected in the images. The building of the digital profile further includes extracting, by the system, a music profile from the social media data of the user that includes a list of audio recordings and analyzing, by the system, the extracted music profile to generate one or more clusters of audio recordings from the extracted music profile and to identify a second set of keywords associated with each cluster of audio recordings, in which the audio recordings are clustered based on at least one of a song category, song type, or song genre. The building of the digital profile further includes generating, by the system, a ranking of keywords based on commonalities between the first set of keywords and the second set of keywords. The method further includes, after building the digital profile, generating a social grouping recommendation for the user based on the ranking of keywords, in which the social grouping recommendation includes event data and a list of one or more second users attending the event.

Embodiments of the present invention provide a system for building a dynamic digital profile of a user to generate a social grouping recommendation, the system having one or more processors configured to perform a method. A non-limiting example of the method includes receiving, by the system, social media data of a user, in which the social media data is received from at least one of a social network website, social network application, or a user device associated with the user. The method includes building, by the system, a digital profile of the user. The building of the digital profile includes extracting, by the system, image data of the user from the social media data of the user and performing, by the system, image recognition on the extracted image data to generate one or more clusters of images from the extracted image data and to identify a first set of keywords associated with each cluster of images, in which the images are clustered based on objects detected in the images. The building of the digital profile further includes extracting, by the system, a music profile from the social media data of the user that includes a list of audio recordings and analyzing, by the system, the extracted music profile to generate one or more clusters of audio recordings from the extracted music profile and to identify a second set of keywords associated with each cluster of audio recordings, in which the audio recordings are clustered based on at least one of a song category, song type, or song genre. The building of the digital profile further includes generating, by the system, a ranking of keywords based on commonalities between the first set of keywords and the second set of keywords. The method further includes, after building the digital profile, generating a social grouping recommendation for the user based on the ranking of keywords, in which the social grouping recommendation includes event data and a list of one or more second users attending the event.

Embodiments of the invention provide a computer program product for building a dynamic digital profile of a user to generate a social grouping recommendation, the computer program product comprising a computer readable storage medium having program instructions embodied therewith. The program instructions are executable by a system having one or more processors to cause the system to perform a method. A non-limiting example of the method includes receiving, by the system, social media data of a user, in which the social media data is received from at least one of a social network website, social network application, or a user device associated with the user. The method includes building, by the system, a digital profile of the user. The building of the digital profile includes extracting, by the system, image data of the user from the social media data of the user and performing, by the system, image recognition on the extracted image data to generate one or more clusters of images from the extracted image data and to identify a first set of keywords associated with each cluster of images, in which the images are clustered based on objects detected in the images. The building of the digital profile further includes extracting, by the system, a music profile from the social media data of the user that includes a list of audio recordings and analyzing, by the system, the extracted music profile to generate one or more clusters of audio recordings from the extracted music profile and to identify a second set of keywords associated with each cluster of audio recordings, in which the audio recordings are clustered based on at least one of a song category, song type, or song genre. The building of the digital profile further includes generating, by the system, a ranking of keywords based on commonalities between the first set of keywords and the second set of keywords. The method further includes, after building the digital profile, generating a social grouping recommendation for the user based on the ranking of keywords, in which the social grouping recommendation includes event data and a list of one or more second users attending the event.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
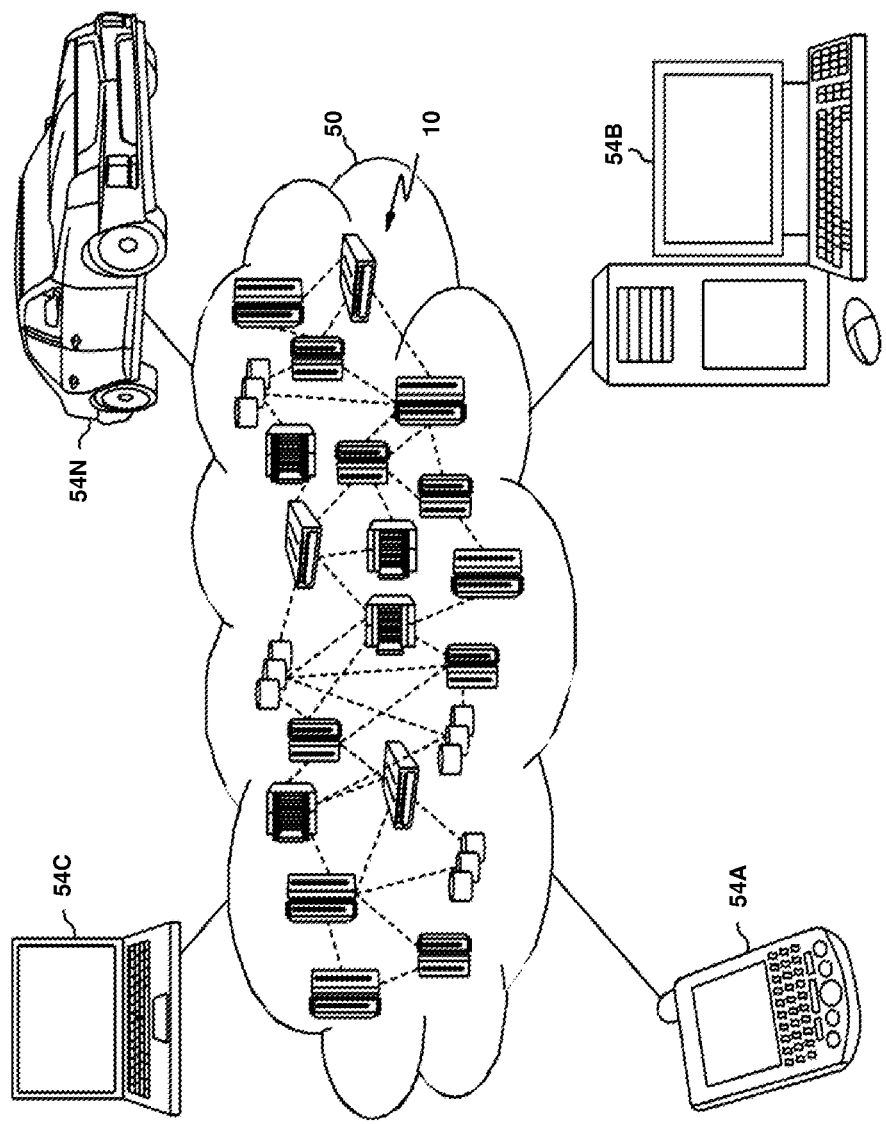
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
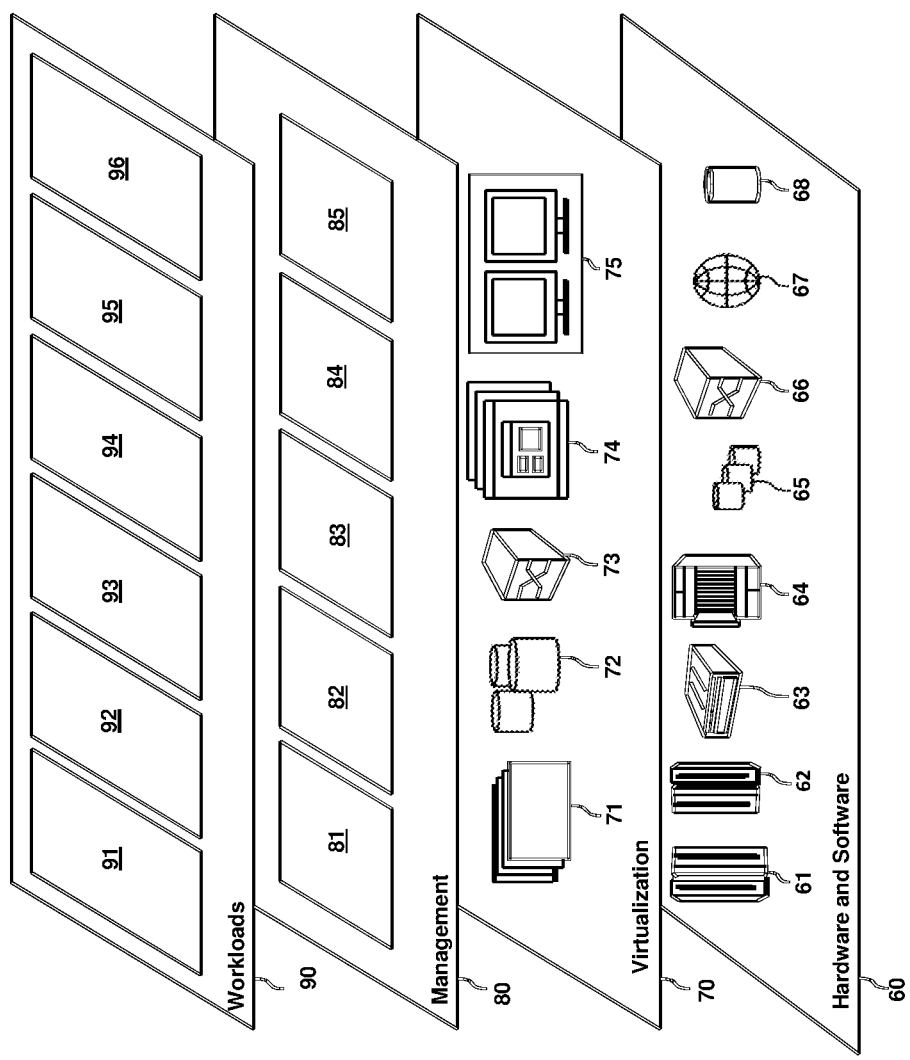
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital profile builder processing 96.

Turning now to an overview of technologies that are more specifically relevant to aspects of the invention, as noted above, over the last few years people become extensively involved with social media and social networks. As an individual's digital media footprint expands, so too has the number of applications, digital stores, tools, and other services that rely on digital media footprints. Some systems generate a digital footprint for a user but those digital footprints are narrow in scope. The narrow digital footprints limits the system's ability to provide broad recommendations for the user. For example, some systems provide an online tool that provides recommendations based on items that the user views or purchases. The purchase history is then leveraged by the system to generate a recommendation as to a next purchase. Similarly, some systems provide an online tool that utilizes location history to recommend a future location. However, those recommendation systems are limited to the scope of the particular tool and thus are limited to providing recommendations of a further action based on prior actions of a same or similar type that is based on a limited knowledgebase of user associated data.

Accordingly, there is a need for an improved recommendation system that utilizes the entire digital footprint of a user when generating a recommended social grouping, which allows for generating a recommendation with a broader scope as compared to those of some known systems.

Turning now to an overview of the aspects of the invention, one or more embodiments of the invention addresses the above-described shortcomings of the prior art by providing a system that provides a social grouping and/or product recommendation for a user based on generating a dynamic digital profile for the user (e.g., social media footprint). In some embodiments of the present invention, the system then takes a particular action in view of the recommendation such as, for example, purchasing tickets to an event, scheduling a seat on an airplane, or other suitable control actions. The system is configured to extract a set of attributes from a variety of types of social media data such as, for example, media images and/or files, and then generate a digital profile that uniquely identifies the user. Once built, the digital profile can be used for a variety of purposes, such as for example, identifying users who have similar interests by comparing the generated digital profile of a particular user with digital profiles of other users. The profile attributes can be extracted from various items found in an online profile of a user as well as from other data obtained from other sources. For example, in regards to extracting items from an online profile, if a user visits an online dating website and fills out a questionnaire indicating the user's likes and/or dislikes, the system may then, in some embodiments of the present invention, build a digital profile based on pictures, music, and other items taken from the dating website as well from other social media sites visited by the user.

In some embodiments of the present invention, the system is configured to generate a social grouping recommendation so that users can connect with similar minded people. Consider an example where a user wishes to purchase tickets for an airplane. In some embodiments of the present invention, the system is configured to identify and assign to the user a seat on the airplane that is believed to be preferred by the user. This may be achieved based on the digital profile that is generated for the user in accordance with one or more embodiments of the present invention. For example, the system may establish via the digital profile whether the user would be interesting in sitting next to a family, be seated with other single passengers, or be seated in a professional working area. By taking into consideration the digital profile of the user, the user is individually benefited as their seating accommodations are established, assigned, and/or scheduled based on the user's particular interests and thus a more relaxing social environment may be provided for the user. The system may provide a benefit to a service provider as well such as, for example an airline, by identifying seats that are likely to be valuable to a user as compared to other seats. The system may be configured to charge the user a premium to sit near a particular person or group of people, and/or to sit away from a particular person or group of people that the user may not wish to sit with.

Consider another example where a user intends to seek out and inform a venue, vessel, facility, and/or other product or service provider about a need for special accommodations as a result of a recent injury, surgery, or permanent handicap. In some embodiments of the present invention, the system is configured to provide options and solutions to the individual during travel based on the built digital profile to identify options that are amendable to the special needs of the user. As the system is configured to ingest and processes social media data of the user, in some embodiments of the present invention, the user does need not directly request information regarding special accommodations, but rather the system itself identifies whether certain special accommodations are recommended. The system may then generate unique logistics to handle any identified specifically accommodations for the user as well as provide the user with instructions for a particular mode of travel and/or activity. For example, if the system identifies that a user has an interest in golf but has detected that the user has difficulty with walking, the system may recommend a driving range of a particular golf venue as such an activity may have limited walking in comparison to recommending a golf course that may require excessive walking.

Consider another example where a user posts a picture of a concert on their online profile. In some embodiments of the present invention, the system is configured to use image recognition technology to identify that the user is at a concert. The system may then query a music profile of the user to identify what types of music is of interest to the user and/or to identify the artist which the user viewed at the concert. The system may then recommend certain other concerts to the user to attend.

In some embodiments of the present invention, the system may recommend a group of users for the user to connect with who have similar interests to the user. For example, in some embodiments of the present invention, once the system recommends a particular event such as a concert to the user, the system may then provide the user with a notification of other concert goers who have related interests. For example, in some embodiments of the present invention, after the system utilizes image recognition technology to identify that a user is at a concert and then queries a music profile of the user to generate a digital profile of the user that can be used to recommend a particular concert, the system may then recommend and/or assign a particular seat on an airplane to the user such that the user is assigned to sit beside one or more people who are similarly traveling to the same recommended concert or have a similar interest in the artist or genre of music associated with the artist who performed at the prior detected concert. In some embodiments of the present invention, the system is configured to narrow down the group of users based on similarity of other attributes such as, for example, a common interest is a particular type of food or restaurant.

In regards to the building of the digital profile, in some embodiments of the present invention, the digital profile is built for the user based on text generated by the user, such as based on a user's online comments, likes, and/or responses to pictures or places. In some embodiments of the present invention, the digital profile is created by a set of weights and measurements that are used to derive a priority of input preferences for the user. For example, in some embodiments of the present invention, the system may, based on an analysis of images and/or other social media data, predict that a user enjoys a particular activity or location such as skiing, golfing, the beach, architecture, or the mountains. The system may then create a weighted table based on how many comments and likes are associated with an activity or location.

In some embodiments of the present invention, the system may utilize software installed on various devices associated with the user to identify the user's preferences such as by, for example, calculating a weighted input based on comments generated by the user in social media data associated with the user. In some embodiments of the present invention, a user's purchase history may be tracked and/or monitored by the system, and then the system identifies whether there are particular events (e.g., food festivals, book signings, concerts) that can be used to prioritize inputs related to certain event options (e.g. travel options). For example, in some embodiments of the present invention, the system may detect that a user previously purchased tickets to a concert of a particular artist, and then the system may generate travel recommendations for a particular country, in which the system prioritizes countries where the artist is known to be performing during a user's desired travel time frame.

In some embodiments of the present invention, the system utilizes a self-learning method that is configured to provide customized input parameters for a social grouping recommendation engine, in which agents provide a base input (e.g., travel dates, budget, location, and interests) to the system, and the system then generates customized input parameters based on a digital profile that has been built for the user. In some embodiments of the present invention, the digital profile may output customized parameters based on calculating a set of weights, constraints, and/or measurements based on social media data of the user.

Figure 3:
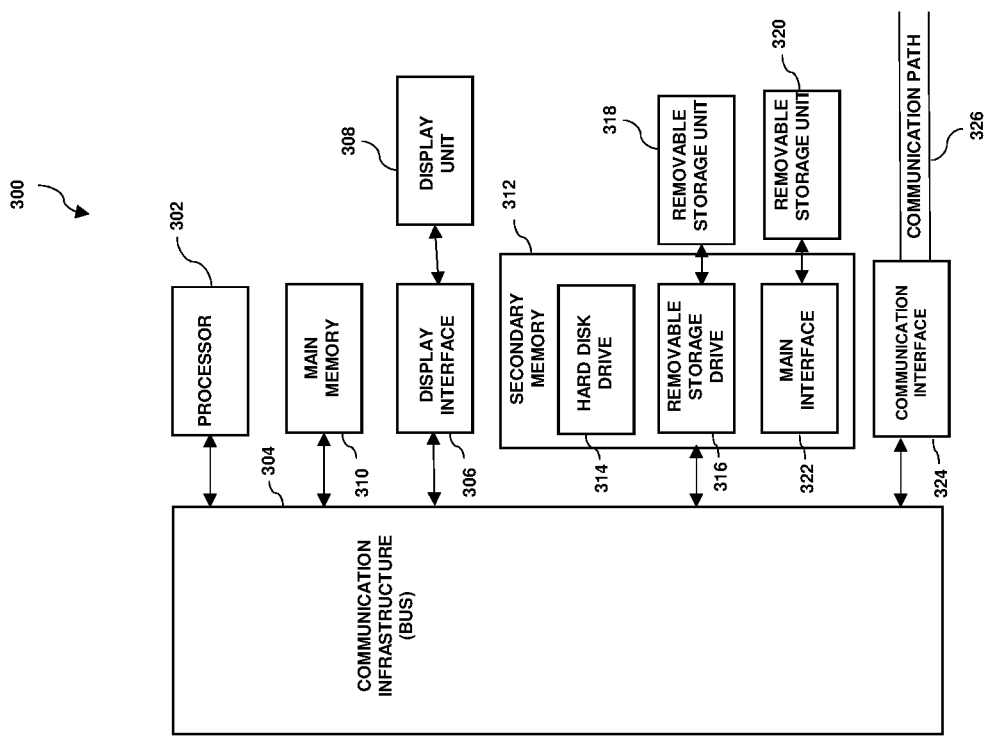
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
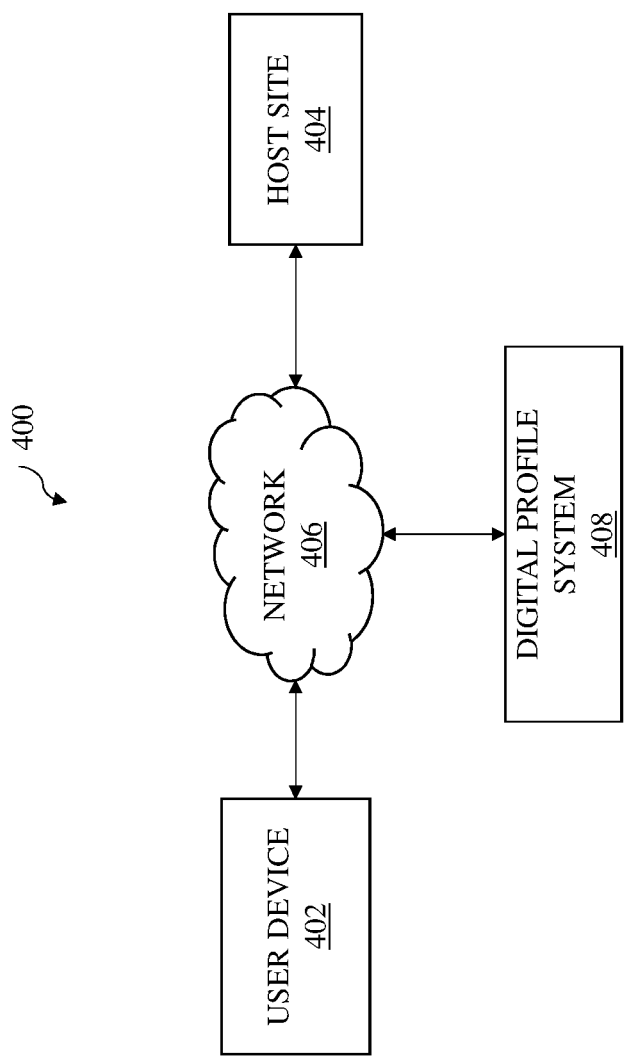
FIG. 4 depicts an exemplary distributed computing environment for building a dynamic digital profile of a user to generate a social grouping recommendation in accordance with one or more embodiments of the present invention.

Referring now to FIG. 4, an example distributed environment 400 is presented for generating a social grouping recommendation for a user based on building a dynamic digital profile of the user in accordance with one or more embodiments of the present invention. Distributed environment 400 includes one or more user devices 402, one or more host sites 404, and a digital profile system 408, which are interconnected over network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

In general, as will be discussed in detail below, in some embodiments of the present invention digital profile system 408 is configured to receive social media data pertaining to a user from one or more user devices 402 and/or from one or more host sites 404, and then to build a digital profile of the user so that a social grouping recommendation can be sent to a user and/or used to control an end system in view of the digital profile built for the user. In some embodiments of the present invention, the social media data is obtained directly from user device 402. In some embodiments of the present invention, the social media data is obtained from a host site 404, such as a social media service provider, which may be obtained in certain embodiments via a social media application or portal.

In some embodiments of the present invention, digital profile system 408 is a standalone computing device, a management server, a web server, a mobile computing device, or other suitable electronic device and/or computing system capable of receiving, sending, and processing data. In some embodiments of the present invention, memory digital profile system 408 is a server computing system utilizing multiple computers, such as in cloud computing environment 50 (FIG. 1). In some embodiments of the present invention, digital profile system 408 is a laptop computer, a tablet computer, a netbook computer, a personal computer (PC), a desktop computer, a personal digital assistant (PDA), a smart phone, or other suitable programmable electronic device capable of communicating with user device 402 and other computing devices (not shown) within distributed environment 400 via network 406. In some embodiments of the present invention digital profile system 408 is a computing system utilizing clustered computers and components (e.g., database server computers, application server computers, etc.) that act as a single pool of seamless resources that are accessible within distributed environment 400. Digital profile system 408 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402, host site 404, digital profile system 408, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow users to send and/or receive information from to digital profile system 408. In some embodiments of the present invention, user device 402 is configured to allow a user to enter social media data into the user device 402 via an input interface (e.g., microphone, camera, keyboard, touch display, etc.) and then to transmit the social media data to digital profile system 408 and/or to host site 404. A user may transmit various forms of social media data via user device 402, such as for example, pictures, audio, video, text based data such as comments, a list of interests, a music profile that lists songs, albums, genres, or artists of interest to the user, as well as fitness information regarding activities performed by the user, location data pertaining to locations traveled to by the user, a calendar that includes event data of prior or future events (e.g., location of an event, name of an event, participants of the event), and/or other types or sources of social media data. In some embodiment of the present invention, user device 402 includes one or more sensors for obtaining sensor data of the user. For example, in some embodiments of the present invention, user device 402 includes a GPS device that is configured to obtain location information of the user device, which may be used to determine a movement pattern of the user, historical location information of the user, or identify other users that are in a vicinity that is proximate to the user (e.g., by comparing location data obtained by various users). In some embodiments of the present invention, user device 402 is configured to capture audio, images, and/or video of an activity of the user via a microphone and/or the camera of user device 402.

In some embodiments of the present invention, user device 402 is a laptop computer, a tablet computer, a netbook computer, a personal computer (PC), a desktop computer, a personal digital assistant (PDA), a smart phone, or other suitable programmable electronic device capable of communicating with various components and devices within distributed environment 400. In some embodiments of the present invention, user device 402 is a programmable electronic mobile device or a combination of programmable electronic mobile devices capable of executing machine readable program instructions and communicating with other computing devices (not shown) within distributed environment 400. In some embodiments of the present invention, user device 402 may include internal and external hardware components, such as those depicted and described above with respect to FIG. 3.

Host site 404 is configured to allow a user to access social media content. In some embodiments of the present invention, host site 404 is a computing device managed by a social media provider, in which the computing device is configured to provide social media content to the user via, for example, a web browser and/or an application executing on user device 402. In some embodiments of the present invention, users may interact with host site 404 to upload various types of social media data so that they may be interconnected with other users through a social media website. In some embodiments of the present invention, host site 404 contains a plurality of user profiles and related operational software enabling user device 402 to interface with host site 404 such as by allowing user device 402 to access a social media profile associated with the user or other users.

In some embodiments of the present invention, host site 404 comprises a server. In some embodiments of the present invention, host site 404 is a laptop computer, a tablet computer, a netbook computer, a personal computer (PC), a desktop computer, a personal digital assistant (PDA), a smart phone, or other suitable programmable electronic device capable of communicating with various components and devices within distributed environment 400. In some embodiments of the present invention, user device 402 is a programmable electronic mobile device or a combination of programmable electronic mobile devices capable of executing machine readable program instructions and communicating with other computing devices (not shown) within distributed environment 400. In some embodiments of the present invention, host site 404 may include internal and external hardware components, such as those depicted and described above with respect to FIG. 3.

Figure 5:
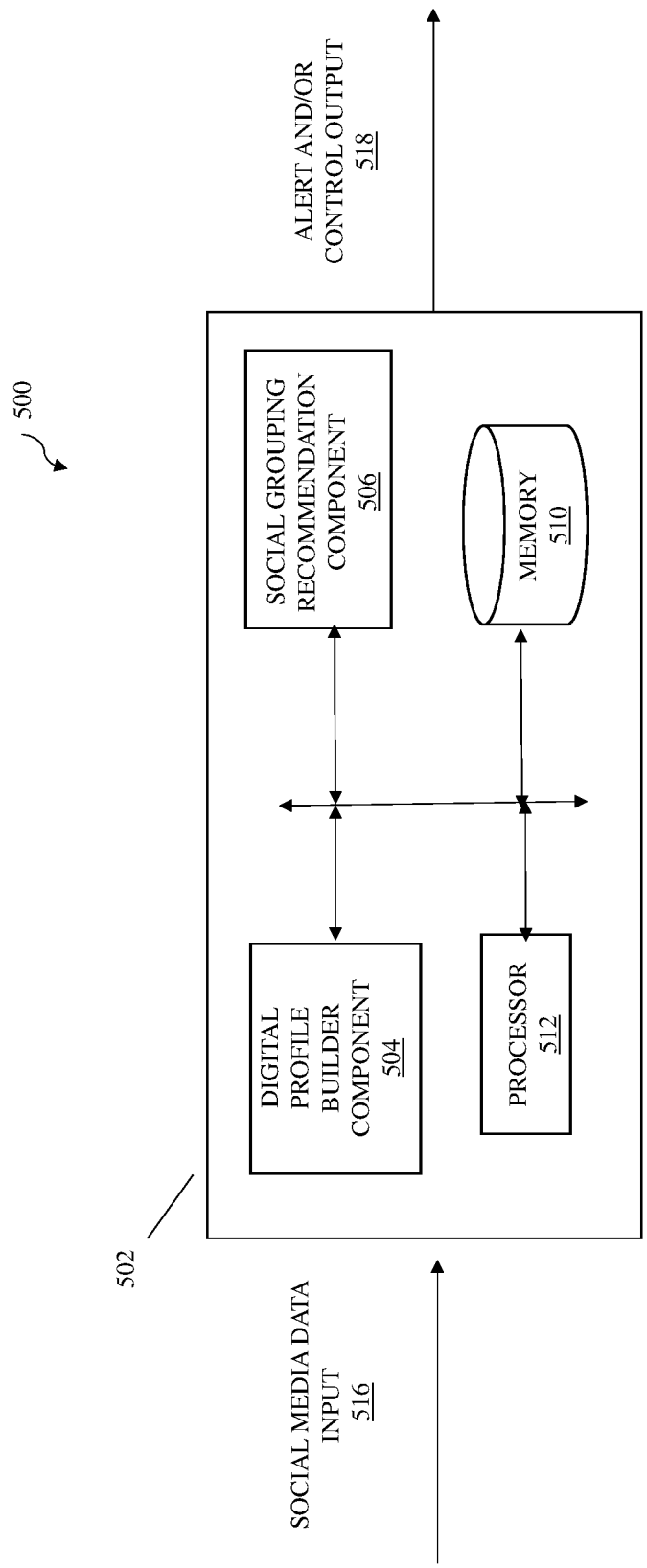
FIG. 5 depicts an exemplary system that builds a dynamic digital profile of a user and generates a social grouping recommendation contacts in accordance with one or more embodiments of the present invention.

FIG. 5 depicts an exemplary system 500 that includes a social grouping and recommendation engine (hereinafter "SGRE") 502 for building a dynamic digital profile and generating a social grouping recommendation (e.g., an example of digital profile system 408), in accordance with one or more embodiment of the present invention. SGRE 502 includes a digital profile builder component 504 and a social grouping recommendation component 506. In some embodiments of the present invention, SGRE 502 constitutes machine-executable component(s) embodied within machine(s), (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, SGRE 502 includes a memory 510 that stores computer executable components and instructions. Furthermore, in some embodiments of the invention, SGRE 502 further includes a processor 512 to facilitate execution of the instructions (e.g., computer executable components and corresponding instructions) by SGRE 502. As shown, digital profile builder component 504, social grouping recommendation component 506, memory 510, and/or processor 512 are electrically and/or communicatively coupled to one another in one or more embodiments of the invention.

SGRE 502 is configured to receive social media data pertaining to a user and then build a digital profile of the user (e.g., via digital profile builder component 504). SGRE 502 is further configured to generate a social grouping recommendation (e.g., via social grouping recommendation component 506), which is then transmitted and/or used to control an end system (e.g., alert and/or control output 518). In some embodiments of the present invention, the social media data (e.g., social media data input 516) is received from a social network website or a social network application (e.g., from host site 404), and/or received from a user device that is associated with the user (e.g., user device 402).

In some embodiments of the present invention, the social grouping recommendation is transmitted to the user or an administrator of the system to alert them of the social grouping recommendation (e.g., alert and/or control output 518). In some embodiments of the present invention the social grouping recommendation includes a specific control output to cause an action to be performed in response to the social grouping that is recommended (e.g., alert and/or control output 518). For example, in some embodiments of the present invention, social grouping recommendation component 506 is configured to purchase tickets for a particular event or assign the user a particular seat for an event. In some embodiments of the present invention, the social grouping recommendation includes event data of a recommended event and a list of one or more second users attending the event. In some embodiments of the present invention, the event data includes an event location and an event time. In some embodiments of the present invention, the event location is a restaurant, an airline flight, a concert, a particular seat on a plane, a particular seat at a concert, and/or another suitable activity location related data. In some embodiments of the present invention, the list of one or more second users is a list of people who are scheduled to attend the event in addition to the user, in which the second users were similarly recommended to attend the event by the system based on digital profiles that were built for those second users.

Digital profile builder component 504 of SGRE 502 is configured to build a digital profile that uniquely identifies the user based on extraction of a combination of one or more different types of social media data such as, for example, image data, music profiles, text data, purchase history, location data and/or other types of social media data. For example, in some embodiments of the present invention, digital profiler building component 504 is configured to build a digital profile for the user by at least extracting image data from the social media data of the user and performing image recognition on the extracted image data to generate one or more clusters of images from the extracted image data. The clustering of images can be used to identify a first set of keywords that are associated with each cluster of images. The digital profiler building component 504 then extracts a music profile from the social media data of the user and analyzes the extracted music profile to generate one or more clusters of audio recordings from the extracted music profile. The clustering of audio recordings can be used to identify a second set of keywords that are associated with each cluster of audio recordings. Digital profile builder component 504 then generates a ranking of keywords based on commonalities between the first set of keywords and the second set of keywords. The generated ranking of keywords can then be used by social grouping recommendation component 506 to generate a social grouping recommendation for the user. For example, in some embodiments of the present invention, social grouping recommendation component 506 is configured to generate a social grouping recommendation for the user based on the ranking of keywords, in which the ranking is based on commonalities between the first set of keywords and the second set of keywords. The various commonalities, clusters, and/or keywords may be identified by the social grouping recommendation component 506 through one or more suitable methods such as, for example, certain machine learning processes as will be discussed below.

In some embodiments of the present invention, digital profile builder component 504 is configured to build the digital profile by further extracting text data from the social media data of the user and parsing the text to identify words in the text that match the first set of keywords or the second set of keywords. The ranking of keywords would then be generated based on commonalities between the first set of keywords, the second set of keywords, and the identified words. The generated ranking of keywords can then be used by social grouping recommendation component 506 to generate a social grouping recommendation for the user. For example, in some embodiments of the present invention, social grouping recommendation component 506 is configured to generate a social grouping recommendation for the user based on the ranking of keywords, in which the ranking is based on commonalities between the first set of keywords, the second set of keywords, and the identified words. In some embodiments of the present invention, the text data includes text that is written by the user and uploaded to a social media website. In some embodiments of the present invention, the text data comprises text data that is entered into a comment window by a user, in which the comment window is configured to store text and/or other user input data that is entered by the user in association with a particular social media item. For example, a user may enter a comment regarding how they feel about a certain product they purchased, a song they listened to, and/or an event they attended. The comment may also be entered by the user in a variety of other suitable ways such as by, for example, clicking a button on a social media website to mark their like or dislike regarding a particular item.

In some embodiments of the present invention, digital profile builder component 504 is configured to the build the digital profile by further extracting purchase history data from the social media data of the user to generate one or more clusters of purchases from the extracted purchase history data and to identify a third set of keywords associated with each cluster of purchases. The ranking of keywords would then be based on commonalities between the first set of keywords, the second set of keywords, and the third set of keywords. The generated ranking of keywords can then be used by social grouping recommendation component 506 to generate a social grouping recommendation for the user. For example, in some embodiments of the present invention, social grouping recommendation component 506 is configured to generate a social grouping recommendation for the user based on the ranking of keywords, in which the ranking is based on commonalities between the first set of keywords, the second set of keywords, and the third set of keywords. In some embodiments of the present invention, the purchase history data includes a list of items purchased and/or consumed by the user, dates related to when the items were purchased and/or consumed, and locations in which the user purchased and/or consumed the items.

In some embodiments of the present invention, digital profile builder component 504 is further configured to build the digital profile by extracting location data from the social media data of the user to identify locations visited by the user and then analyzing the location history to generate one or more clusters of locations. In some embodiments of the present invention, social grouping recommendation component 506 is configured to generate a social grouping recommendation for the user based on the one or more clusters of locations and the ranking of keywords (e.g., first set of keywords, second set of keywords, and/or third set of keywords). In some embodiments of the present invention, a calendar associated with the user is searched to identify prior events attended to by the user or future events scheduled to be attended by the user.

Consider an example where digital profile builder component 504 extracts image data, a music profile, and texted data from the social media data of a user. In some embodiments of the present invention, digital profile builder component 504 may receive images and/or pictures uploaded by the user or associated with the user and then execute an image recognition process to create groups and/or categories corresponding to images. In some embodiments of the present invention, digital profile builder component 504 would then identify based on the image recognition certain keywords that are associated with a detected object (e.g., the name of an object, a location where the object was photographed, people detected via facial recognition that appear in a scene of the photograph, etc.). A music profile is then extracted from the social media data and examined by digital profile builder component 504 to group the music by category, song title, artist, and/or genre. Digital profile builder component 504 then reviews comments made by the user to look for keywords that match the recognized image categories and/or keywords and the recognized music categories and/or keywords. Digital profile builder component 504 then reviews a purchase history of the user and groups keywords from purchases and categories these keywords. Digital profile builder component 504 then creates rankings based on commonalities between all of the various categories and/or keywords that have been generated in this example scenario. Digital profile builder component 504 may then search a calendar and/or location history of the user to group common locations and/or pending trips locations. Social grouping recommendation component 506 is configured to obtain the digital profile that was built by digital profile builder component 504. Social grouping recommendation component 506 then suggests social encounters, events, and/or particular activities based on the location groupings and the ranked categories and/or keywords established by the digital profile.

Various suitable machine learning algorithms may be used to extract social media data, generate clusters, identify keywords, identify commonalities between keyword clusters or categories, or generate similarity scores. In one example, a Watson API service may be used to implement and/or call a machine learning algorithm that analyzes the received social media data. The following are non-limiting examples of cognitive APIs that may be used: Alchemy Language Icon Alchemy Language, Conversation Service Icon Conversation, Dialog Icon Dialog (Deprecated), Document Conversion Icon Document Conversion, Language Translator Icon Language Translator, Natural Language Classifier Icon Natural Language Classifier, Natural Language Understanding Icon Natural Language Understanding, Personality Insights Icon Personality Insights, Retrieve and Rank Icon Retrieve and Rank, Tone Analyzer Icon Tone Analyzer, Visual Recognition Icon Visual Recognition, Discovery Icon Discovery, and Tradeoff Analytics Icon Tradeoff Analytics.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the present invention, social grouping recommendation component 506 is configured to generate the list of one or more second users (e.g., additional users) who are planning and/or attending the recommended event by generating a similarity score that is based on similarities between the digital profile of the user and digital profiles of other users. For example, in some embodiments of the present invention, the list of one or more second users is generated by social grouping component 506 based on receiving a digital profile for a plurality of second users, in which the digital profiles of the plurality of second users is generated and/or obtained by digital profile builder component 504. Social grouping component 506 then generates a similarity score between the digital profile of the user and the digital profile of each second user of the plurality of second users. For each given second user of the plurality of second users, if the generated similarity score between the user and the given second user is determined to be greater than or equal to a minimum similarity threshold, then the given second user is added to the list of one or more second users who are attending the recommended event and/or are scheduled to attend the recommended event. In some embodiments of the present invention, the similarity score is generated by executing one or more machine learning processes that are configured to establish a minimum similarity score threshold for use by social grouping recommendation component 506 and/or to calculate similarity scores between digital profiles. In some embodiments of the present invention, the minimum similarity score threshold is established and/or entered by an administrator of system 500. In some embodiments of the present invention, the minimum similarity score threshold is established and/or entered by the user.

Figure 6:
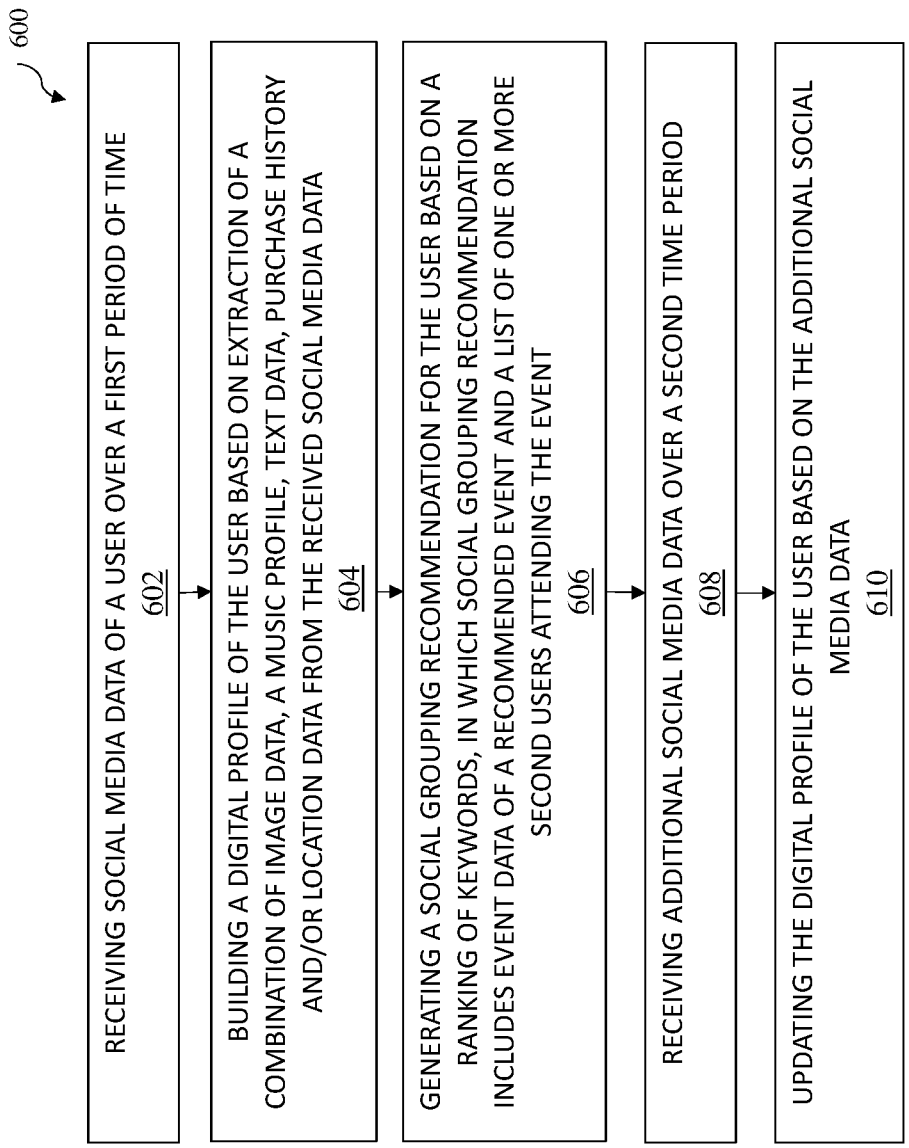
FIG. 6 depicts a flow diagram illustrating a methodology in accordance with one or more embodiments of the present invention.

Additional details of the operation of system 500 will now be described with reference to FIG. 6, in which FIG. 6 depicts a flow diagram illustrating a methodology 600 according to one or more embodiments of the present invention. At 602, social media data pertaining to a user is received. The social media data may be associated with a certain time frame (i.e., the first time period) during which the social media data is collected. At 604, a digital profile is built for the user based on extraction of a combination of image data, a music profile, text data, purchase history data, and/or location data of the user from the social media data. At 606, a social grouping recommendation is generated for the user based on a ranking of keywords, in which the ranking of keywords is established by the digital profile. At 608, additional social media data pertaining to the user is received over a second time period, in which the second time period is subsequent to the first time period. At 610, the digital profile of the user is updated based on the additional social media data.

In regards to building of the digital profile, in some embodiments of the present invention, the building of the digital profile includes extracting image data of the user from the social media data of the user, performing image recognition on the extracted image data to generate one or more clusters of images from the extracted image data and to identify keywords associated with each cluster of images, extracting a music profile from the social media data of the user, analyzing the extracted music profile to generate one or more clusters of audio recordings from the extracted music profile and to identify keywords associated with each cluster of audio recordings, and generating a ranking of keywords based on commonalities between the first set of keywords and the second set of keywords.

In some embodiments of the present invention, the building of the digital profile further or alternatively includes extracting text data from the social media data of the user, the text data comprising text written by the user, and parsing the text to identify words in the text that match the first set of keywords or the second set of keywords, in which the ranking of keywords is generated based on commonalities between the first set of keywords, the second set of keywords, and the identified words.

In some embodiments of the present invention, the building of the digital profile further or alternatively includes extracting purchase history data from the social media data of the user, and analyzing the extracted purchase history data to generate one or more clusters of purchases from the extracted purchase history data and to identify a third set of keywords associated with each cluster of purchases, in which the ranking of keywords is generated based on commonalities between the first set of keywords, the second set of keywords, and the third set of keywords.

In some embodiments of the present invention, the building of the digital profile further or alternatively includes extracting location data from the social media data of the user, and analyzing the location history to generate one or more clusters of locations, in which the social grouping recommendation for the user is generated based on the ranking of keywords and the one or more clusters of locations.

In some embodiments of the present invention, the list of one or more second users is generated by obtaining or generating a digital profile for a plurality of second users and then generating a similarity score between the digital profile of the user and the digital profile of each second user of the plurality of second users. For each given second user of the plurality of second users, if the generated similarity score between the user and the given second user is determined to be greater than or equal to the minimum similarity threshold, then the given second user is added to the list of one or more second users who are attending the recommended event and/or are scheduled to attend the recommended event.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for building a dynamic digital profile of a user to generate a social grouping recommendation, the method comprising:
   receiving, by a system comprising one or more processors, social media data of a user, wherein the social media data is received from at least one of a social network website, social network application, or a user device associated with the user;
   building, by the system, a digital profile of the user by at least:
      extracting, by the system, image data of the user from the social media data of the user;
      performing, by the system, image recognition on the extracted image data to generate one or more clusters of images from the extracted image data and to identify a first set of keywords associated with each cluster of images, wherein the images are clustered based on objects detected in the images;
      extracting, by the system, a music profile from the social media data of the user, wherein the music profile includes a list of audio recordings;
      analyzing, by the system, the extracted music profile to generate one or more clusters of audio recordings from the extracted music profile and to identify a second set of keywords associated with each cluster of audio recordings, wherein the audio recordings are clustered based on at least one of a song category, song type, or song genre; and
      generating, by the system, a ranking of keywords based on commonalities between the first set of keywords and the second set of keywords; and
   generating a social grouping recommendation for the user based on the ranking of keywords, wherein the social grouping recommendation includes event data of a recommended event and a list of one or more second users attending the event.

2. The computer-implemented method of claim 1, wherein building the digital profile further includes:
   extracting text data from the social media data of the user, the text data comprising text written by the user; and
   parsing the text to identify words in the text that match the first set of keywords or the second set of keywords, wherein the ranking of keywords is based on commonalities between the first set of keywords, the second set of keywords, and the identified words.

3. The computer-implemented method of claim 1, wherein building the digital provide further includes:
   extracting purchase history data from the social media data of the user, the purchase history data comprising a list of products purchased by the user; and
   analyzing the extracted purchase history data to generate one or more clusters of purchases from the extracted purchase history data and to identify a third set of keywords associated with each cluster of purchases, wherein the ranking of keywords is based on commonalities between the first set of keywords, the second set of keywords, and the third set of keywords.

4. The computer-implemented method of claim 1, wherein building the digital profile further includes:
   extracting location data from the social media data of the user, the location data comprising a location history of the user; and
   analyzing the location history to generate one or more clusters of locations, wherein generating the social grouping recommendation for the user is based on the ranking of keywords and the one or more clusters of locations.

5. The computer-implemented method of claim 1, wherein the list of one or more second users is generated by at least:
   generating or obtaining a digital profile for each second user of a plurality of second users; and
   for each second user of the plurality of second users:
      generating, by the system a similarity score between the digital profile of the user and the digital profile of the second user; and
      upon determining that the similarity score is greater than or equal to a minimum similarity threshold, adding the second user to the list of one or more second users.

6. The computer-implemented method of claim 1, wherein the event data comprises an event location and an event time, wherein the event location comprises one or more of a restaurant, an airline flight, or a concert, wherein the list of one or more second users comprises a list of people scheduled to attend the event in addition to the user.

7. The computer-implemented method of claim 1, wherein the social media data is received over a first time period, wherein the method further includes:
   receiving additional social media data of the user over a second time period, wherein the second time period is subsequent to the first time period; and
   updating the digital profile of the user based on the additional social media data.

8. A computer program product for building a dynamic digital profile of a user to generate a social grouping recommendation, the computer program product comprising a computer readable storage medium having program instructions embodied therewith, wherein the computer readable storage medium is not a transitory signal per se, the program instructions executable by a system comprising one or more processors to cause the system to perform a method comprising:
   receiving, by the system, social media data of a user, wherein the social media data is received from at least one of a social network website, social network application, or a user device associated with the user;
   building, by the system, a digital profile of the user by at least:
      extracting, by the system, image data of the user from the social media data of the user;
      performing, by the system, image recognition on the extracted image data to generate one or more clusters of images from the extracted image data and to identify a first set of keywords associated with each cluster of images, wherein the images are clustered based on objects detected in the images;
      extracting, by the system, a music profile from the social media data of the user, wherein the music profile includes a list of audio recordings;
      analyzing, by the system, the extracted music profile to generate one or more clusters of audio recordings from the extracted music profile and to identify a second set of keywords associated with each cluster of audio recordings, wherein the audio recordings are clustered based on at least one of a song category, song type, or song genre; and generating, by the system, a ranking of keywords based on commonalities between the first set of keywords and the second set of keywords; and generating a social grouping recommendation for the user based on the ranking of keywords, wherein the social grouping recommendation includes event data of a recommended event and a list of one or more second users attending the event.

9. The computer program product of claim 8, wherein building the digital profile further includes:

extracting text data from the social media data of the user, the text data comprising text written by the user; and parsing the text to identify words in the text that match the first set of keywords or the second set of keywords, wherein the ranking of keywords is based on commonalities between the first set of keywords, the second set of keywords, and the identified words.

10. The computer program product of claim 8, wherein building the digital provide further includes:

extracting purchase history data from the social media data of the user, the purchase history data comprising a list of products purchased by the user; and analyzing the extracted purchase history data to generate one or more clusters of purchases from the extracted purchase history data and to identify a third set of keywords associated with each cluster of purchases, wherein the ranking of keywords is based on commonalities between the first set of keywords, the second set of keywords, and the third set of keywords.

11. The computer program product of claim 8, wherein building the digital profile further includes:

extracting location data from the social media data of the user, the location data comprising a location history of the user; and analyzing the location history to generate one or more clusters of locations, wherein generating the social grouping recommendation for the user is based on the ranking of keywords and the one or more clusters of locations.

12. The computer program product of claim 8, wherein the list of one or more second users is generated by at least:

generating or obtaining a digital profile for each second user of a plurality of second users; and for each second user of the plurality of second users:

generating, by the system a similarity score between the digital profile of the user and the digital profile of the second user; and upon determining that the similarity score is greater than or equal to a minimum similarity threshold, adding the second user to the list of one or more second users.

13. The computer program product of claim 8, wherein the event data comprises an event location and an event time, wherein the event location comprises one or more of a restaurant, an airline flight, or a concert, wherein the list of one or more second users comprises a list of people scheduled to attend the event in addition to the user.

14. The computer program product of claim 8, wherein the social media data is received over a first time period, wherein the method further includes:

receiving additional social media data of the user over a second time period, wherein the second time period is subsequent to the first time period; and updating the digital profile of the user based on the additional social media data.

15. A system for building a dynamic digital profile of a user to generate a social grouping recommendation, the system comprising one or more processors configured to perform a method comprising:

receiving, by the system, social media data of a user, wherein the social media data is received from at least one of a social network website, social network application, or a user device associated with the user;

building, by the system, a digital profile of the user by at least:

extracting, by the system, image data of the user from the social media data of the user;

performing, by the system, image recognition on the extracted image data to generate one or more clusters of images from the extracted image data and to identify a first set of keywords associated with each cluster of images, wherein the images are clustered based on objects detected in the images;

extracting, by the system, a music profile from the social media data of the user, wherein the music profile includes a list of audio recordings;

analyzing, by the system, the extracted music profile to generate one or more clusters of audio recordings from the extracted music profile and to identify a second set of keywords associated with each cluster of audio recordings, wherein the audio recordings are clustered based on at least one of a song category, song type, or song genre; and generating, by the system, a ranking of keywords based on commonalities between the first set of keywords and the second set of keywords; and generating a social grouping recommendation for the user based on the ranking of keywords, wherein the social grouping recommendation includes event data of a recommended event and a list of one or more second users attending the event.

16. The system of claim 15, wherein building the digital profile further includes:

extracting text data from the social media data of the user, the text data comprising text written by the user; and parsing the text to identify words in the text that match the first set of keywords or the second set of keywords, wherein the ranking of keywords is based on commonalities between the first set of keywords, the second set of keywords, and the identified words.

17. The system of claim 15, wherein building the digital provide further includes:

extracting purchase history data from the social media data of the user, the purchase history data comprising a list of products purchased by the user; and analyzing the extracted purchase history data to generate one or more clusters of purchases from the extracted purchase history data and to identify a third set of keywords associated with each cluster of purchases, wherein the ranking of keywords is based on commonalities between the first set of keywords, the second set of keywords, and the third set of keywords.

18. The system of claim 15, wherein building the digital profile further includes:

extracting location data from the social media data of the user, the location data comprising a location history of the user; and analyzing the location history to generate one or more clusters of locations, wherein generating the social grouping recommendation for the user is based on the ranking of keywords and the one or more clusters of locations.

19. The system of claim 15, wherein the list of one or more second users is generated by at least:
- generating or obtaining a digital profile for each second user of a plurality of second users; and
- for each second user of the plurality of second users:
  - generating, by the system a similarity score between the digital profile of the user and the digital profile of the second user; and
  - upon determining that the similarity score is greater than or equal to a minimum similarity threshold, adding the second user to the list of one or more second users.

20. The system of claim 15, wherein the social media data is received over a first time period, wherein the method further includes:
- receiving additional social media data of the user over a second time period, wherein the second time period is subsequent to the first time period; and
- updating the digital profile of the user based on the additional social media data.

* * * * *